July 30, 1957 R. C. CLOUGH ET AL 2,801,328
APPARATUS FOR WELDING CONTACTS ONTO A METAL STRIP
Filed May 16, 1955 5 Sheets-Sheet 4

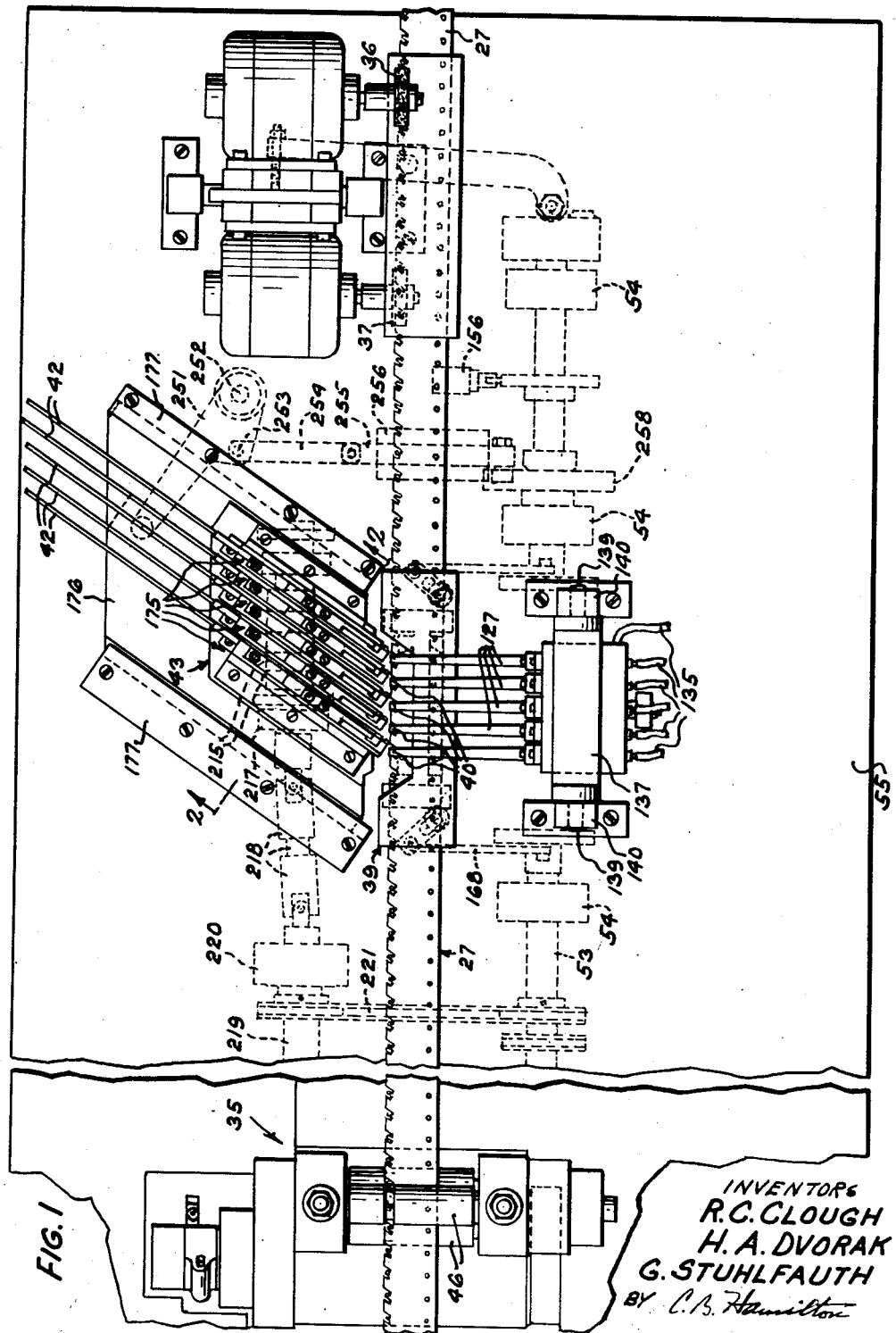
FIG. I
INVENTORS
R.C. CLOUGH
H.A. DVORAK
G. STUHLFAUTH
BY C.B. Hamilton
ATTORNEY

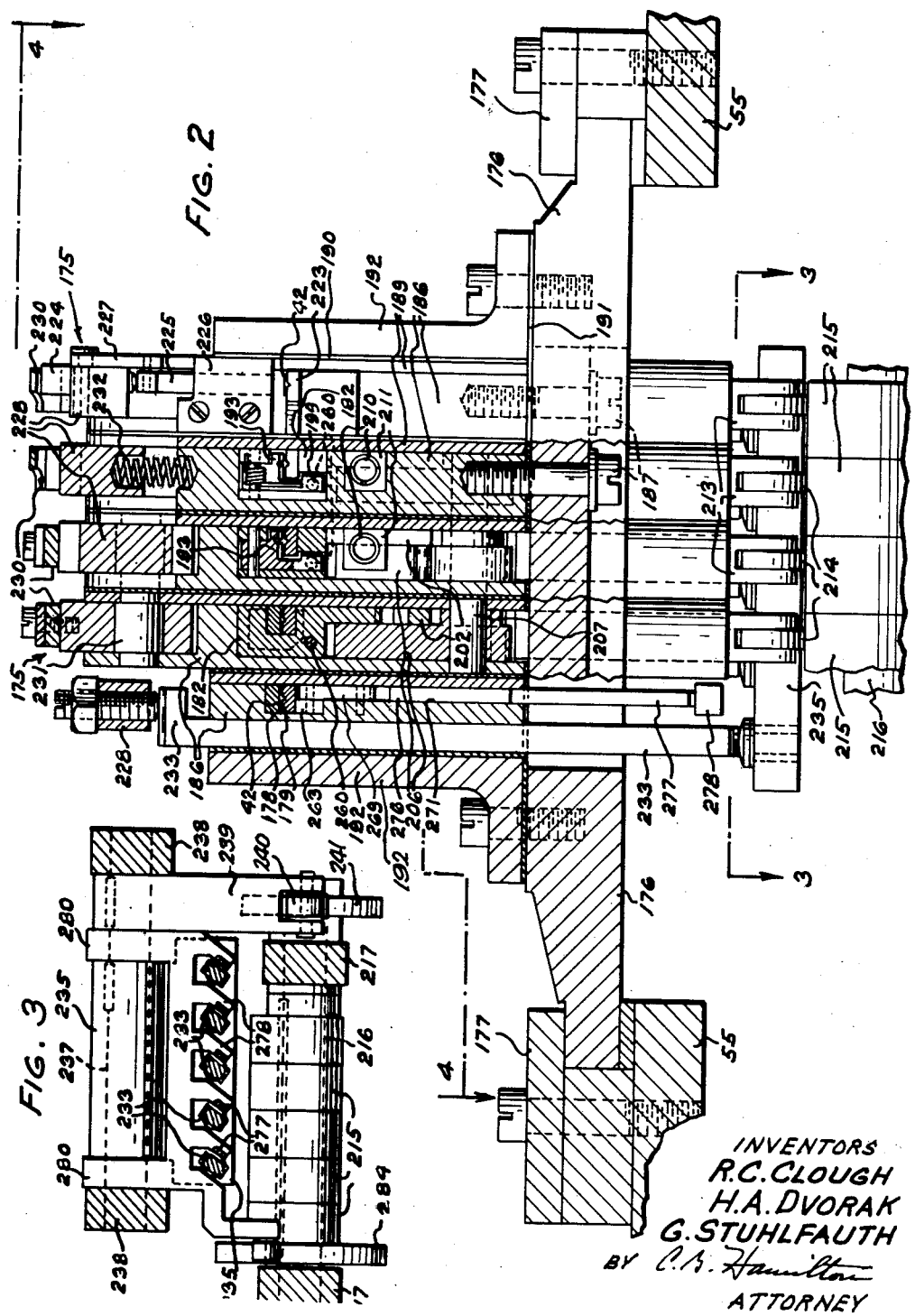

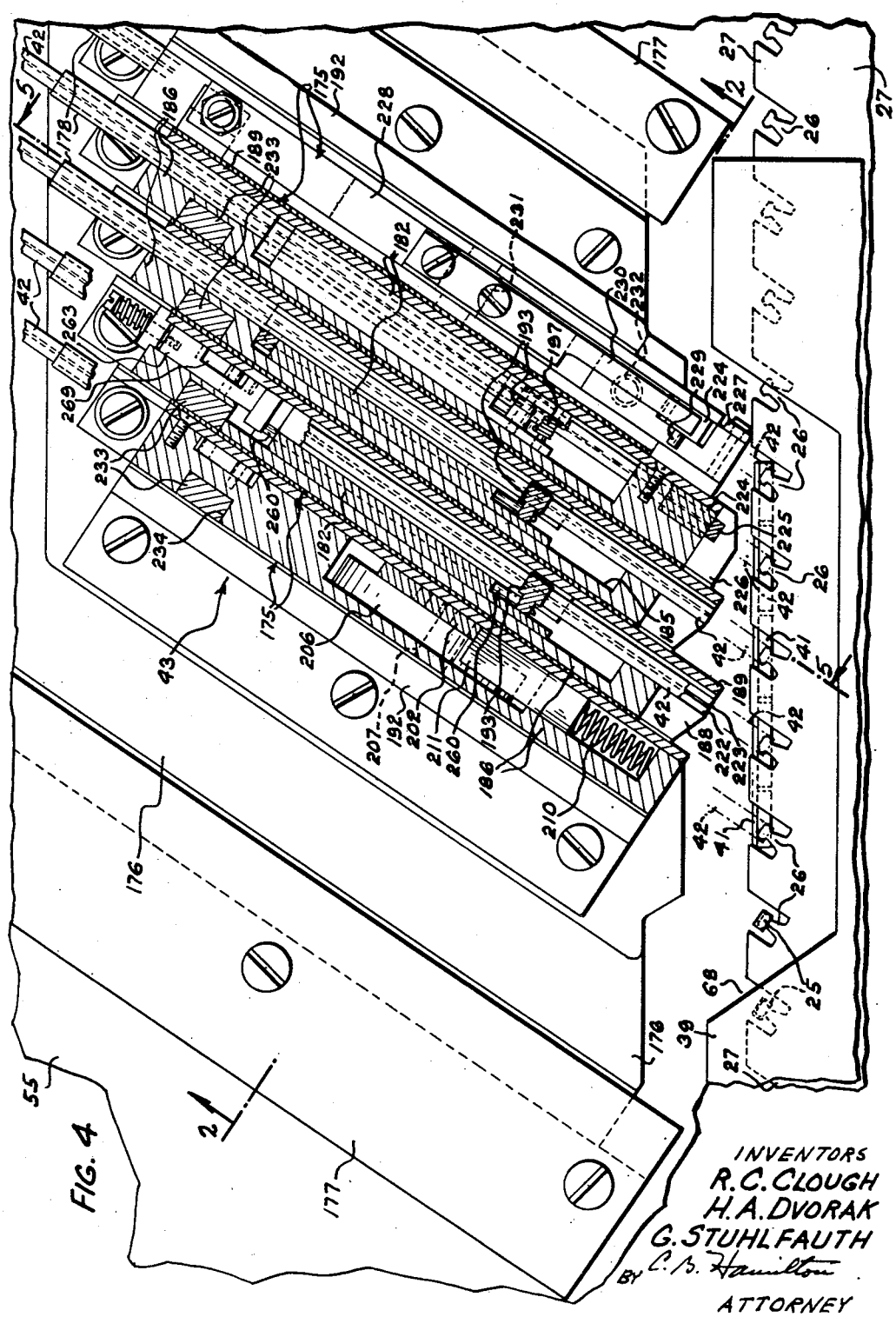

INVENTORS
R.C. CLOUGH
H.A. DVORAK
G. STUHLFAUTH
BY C.B. Hamilton
ATTORNEY

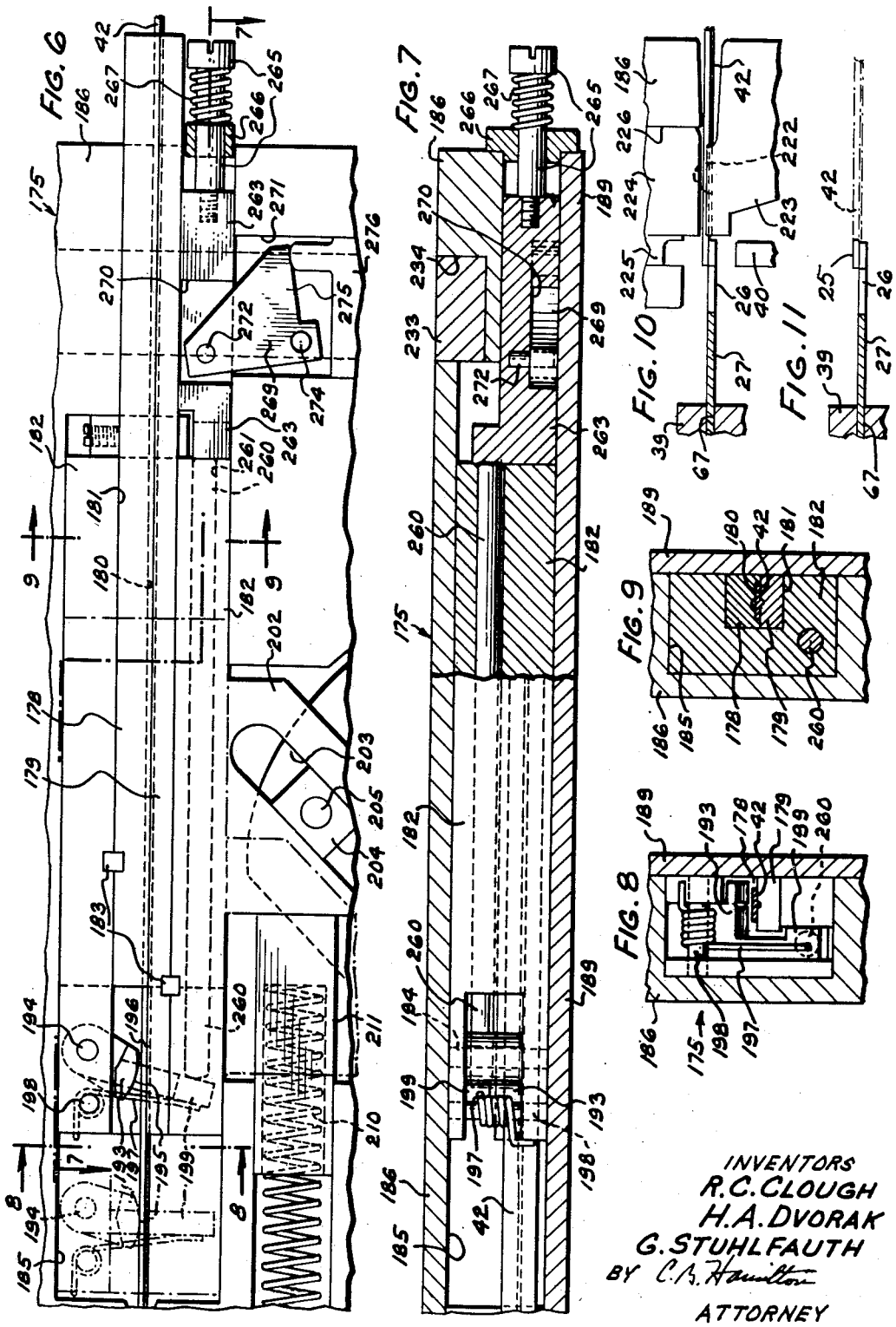

2,801,328
APPARATUS FOR WELDING CONTACTS ONTO A METAL STRIP

Robert C. Clough, Lombard, Howard A. Dvorak, Brookfield, and George Stuhlfauth, Chicago, Ill., assignors to Western Electric Company, Incorporated, New York, N. Y., a corporation of New York Application May 16, 1955, Serial No. 508,448

7 Claims. (Cl. 219—79)

This invention relates to an apparatus for feeding and welding the ends of contact tapes onto a metal strip and shearing the tapes adjacent the strip to form contacts thereon and more particularly to the tape feeding and shearing mechanisms thereof.

An object of the invention is to provide an apparatus for feeding a plurality of tapes into engagement with a plurality of tangs formed on a strip, welding the ends of the tapes to the tangs, and shearing the tapes to form contacts on the tangs.

Another object of the invention is to provide in a welding apparatus a novel mechanism for feeding a plurality of tapes into engagement with a metal strip to which the tapes are to be welded and for shearing the tapes adjacent the strip after the tapes have been welded thereto to form contacts on the strip.

An apparatus illustrating certain features of the invention may include a frame having a holder mounted thereon for supporting in a welding position a preformed strip with a plurality of obliquely disposed contacts along one edge thereof. A carriage mounted on the frame for oblique movement toward and away from the holder supports a plurality of reciprocable tape feeding bars which have guideways for supporting a plurality of tapes and which have gripping jaws thereon spring actuated to closed position to press the tapes against the tape feeding bars for movement therewith toward the strip. The feeding bars are advanced on the carriage to move the tapes into overlapping relation with the tangs on said strip, after which pairs of cooperating electrodes are moved into engagement with the overlapping portions of the tapes and the tangs of the strip, and welding currents are passed therethrough to weld the ends of the tapes onto the strip. The gripping jaws are then actuated to open position to release their grip on the tapes, after which the carriage is advanced toward the holder to position pairs of tape cutting jaws carried thereby into close proximity to the strip. The cutting jaws are then actuated to shear the tapes adjacent the tangs on the strip to form contacts thereon, after which the carriage is returned to its normal retracted position and the release mechanism is disengaged from the tape gripping jaws, which are then spring returned to their closed position to again grip the tape against the feed bars for feeding movement therewith. Clamping members on the carriage are actuated in timed relation to the other components to clamp the tapes to the carriage and hold them against movement while the tape feeding bars are returned to their normal position and while the carriage is being returned to its normal retracted position after the tapes have been severed.

Other objects and advantages of the invention will become apparent by reference to the following detailed description and the accompanying drawings illustrating a preferred embodiment thereof, in which Fig. 1 is a plan view of the welding apparatus with the tape feeding and severing mechanism thereon;

Fig. 2 is an enlarged vertical cross sectional view through the tape feeding and severing mechanism taken on line 2—2 of Fig. 1;

Fig. 3 is a fragmentary plan sectional view of the mechanism taken on line 3—3 of Fig. 2;

Fig. 4 is an enlarged fragmentary plan sectional view of the mechanism taken at different elevations on line 4—4 of Fig. 2;

Fig. 6 is an enlarged fragmentary view of a portion of the tape feeding mechanism shown in Fig. 5 and showing some of the parts thereof in different positions;

Fig. 7 is a fragmentary plan sectional view of the tape feeding mechanism taken on line 7—7 of Fig. 6;

Figure 5:
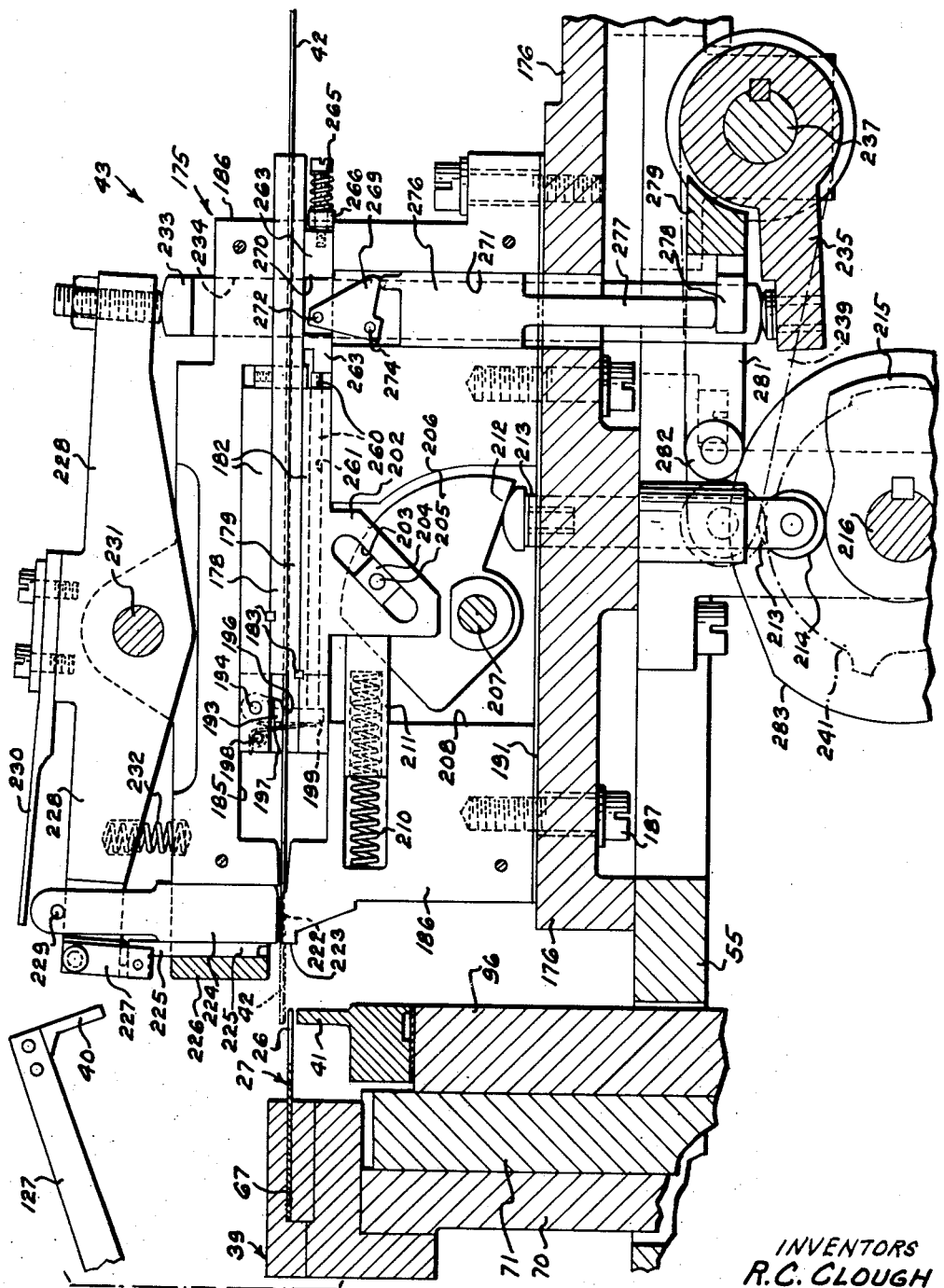
Fig. 5 is a fragmentary vertical longitudinal sectional view of the tape feeding and severing mechanism taken on line 5—5 of Fig. 4.

Figs. 8 and 9 are fragmentary vertical cross sectional views of the feeding mechanism taken on lines 8—8 and 9—9 of Fig. 6;

Fig. 10 is an enlarged fragmentary view of the tape severing mechanism in position for severing the tape; and Fig. 11 is a fragmentary vertical sectional view showing a metal strip with a contact welded thereto.

The present apparatus is designed to weld contacts 25 of precious metal onto a plurality of tangs 26 disposed obliquely along one edge of a preformed metal strip (Figs. 4 and 11) as disclosed in detail in the copending application by Clough et al., Serial No. 508,664, filed May 16, 1955, on an apparatus for welding contacts onto a part. In general, the apparatus comprises a feed means 35 (Fig. 1) for intermittently advancing the strip 27 predetermined uniform distances to feed successive groups of five tangs 26 to a welding station, a pair of rotary wire brushes 36 and 37 for scratch brushing the upper and lower surfaces of the tangs to clean them preparatory to welding the contacts thereon, a holder 39 for supporting the strip 27 at the welding station, five sets of upper and lower electrodes 40 and 41, respectively, connected individually to welding circuits and cooperable to simultaneously weld five contact tapes 42 onto five tangs of the strip, and tape feeding and severing mechanism 43 for feeding the contact tapes in a horizontal plane into overlapping relation with the tangs and for severing the tapes adjacent the tangs after the tape has been welded thereto to form contacts on the strip.

The various components of the apparatus are mounted on a horizontally disposed main frame plate 55 to the underneath side of which are secured bearing members 54 for supporting a main cam shaft 53 which is driven by a motor not shown. The strip holder 39 is in the form of a composite flat rectangular block having a horizontal guideway 67 for supporting the strip 27 for intermittent longitudinal movement, and as viewed from above it is provided with a recess 68 intermediate its ends to expose in a welding station the five tangs 26 on which the contacts 25 are to be welded and to provide clearance for engagement of the tangs and the contact tapes 42 by the electrodes 40 and 41. The holder 39 is secured to the upper end of a slide 70 which is mounted for vertical reciprocation on a slide support 71 which is secured to the main frame plate 55. The contact tapes 42, each of which has a centrally disposed welding bead on one face thereof, are advanced in a horizontal plane at a predetermined fixed level into overlapping relation with the tangs 26 of the strip 27 and during the feeding movement of the contact the guide 39 is lowered by means (not shown) including a cam on the cam shaft 53 to position the strip below and in spaced relation to the frame of the contact tapes 42. After the contact tapes have been advanced into overlapping relation with the tangs the guide 39 is actuated to raise the strip 27 into engagement with the tape.

The lower electrodes 41 are secured to the upper end of a slide 96 in insulated relation to each other and to the slide, and the slide is mounted for vertical reciprocation in the support 71 and is actuated by means including a cam (not shown) on the cam shaft 53 for moving the electrodes into and out of engagement with the tangs 26 during the welding of the ends of the tapes to the tangs.

The upper electrodes 40 extend transversely from the ends of cantilevers 127 which are supported in a cradle 137 for oscillatable movement about trunnions 139 journalled in bearing blocks 140 mounted on the frame plate 55. Means including a cam (not shown) on the cam shaft 53 actuates the cradle 137 to move the upper electrodes 40 downwardly into engagement with the ends of the contact tapes 42 to press the tapes 42 and the tangs 26 against raised lower electrodes 40, during which welding currents are passed through the electrodes to weld the ends of the tapes to the tangs.

The tape feeding and severing mechanism 43 comprises five individual tape feeding and severing units 175 obliquely mouned side by side on a carriage 176 in stepped or echelon relation to each other. The carriage 176 is supported in guides 177 on the frame plate 55 for horizontal movement in an oblique direction for moving the units 175 toward and away from the five obliquely disposed tangs 26 onto which the contact tapes 42 are to be welded. Each of the tape feeding and severing units 175 comprises a pair of horizontaly disposed superposed guide rails 178, 179 (Figs. 5–7) grooved to form a guideway 180 therebetween for guiding the contact tape 42 therethrough. The guide rails 178, 179 are supported in a recess 181 of a U-shaped tape feed bar 182 and are secured therein against longitudinal movement by keys 183. The tape feed bar 182 is supported in a guideway 185 in a vertically disposed frame plate 186 which is secured at its lower edge to the carriage 176 by screws 187. A cover plate 189 is screwed to the side of the frame plate 186 and serves to prevent lateral displacement of the guide rails 178, 179 and the tape feed bar 182. The individual tape feeding and severing units 175 and the carriage 176 are separated from each other by strips of insulation 190 and 191 and a pair of L-shaped brackets 192 help to rigidly secure the tape feeding units on the carriage 176.

The tape feed 182 and the lower guide rail 179 extend a predetermined distance beyond the forward end of the upper guide rail 178 (Figs. 5 and 6) and the upper overhanging portion of the tape feed bar is vertically slotted to receive a movable tape gripping jaw 193 which is mounted for oscillatable movement on a pivot pin 194, the ends of which are supported in the overhanging portion of the slide bar 182. The jaw 193 has a curved lower surface 195 which is disposed in eccentric relation to the pivot pin 194 and is adapted to engage the upper surface of the contact tape 42 and press it against the upper surface of a jaw 196 formed by the projecting end of the lower guide rail 179. A torsion spring 197 supported on a pin 198 on the slide bar 182 engages a downwardly directed arm 199 on the movable jaw 193 to urge the jaw in a counter-clockwise direction toward the lower jaw as viewed in Fig. 6 to effect a gripping engagement with the tape 42 for feeding movement to the left as viewed in said figure.

Means are provided for reciprocating the tape feed bar 182 to advance the tape 42 into overlapping relation with the tangs 26 of the strip 27 and for this purpose the tape feed bar has a relatively thin downwardly projecting plate portion 202 which is provided with an obliquely disposed slot 203 in which a block 204 is slidably mounted. The block 204 is pivotally supported on a horizontally disposed pin 205 fixed to a rocker arm 206 which is mounted for oscillatable movement about a pin 207 journalled at its ends in the frame plate 186 and the cover plate 189. The rocker arm 206, which is disposed in a recess 208 in the frame plate 186, and the tape feed bar 182 are urged for movement to the right to their normal retracted positoin by a spring 210 and a plunger 211 slidably mounted in a horizontal slot in the frame plate 186 and bearing against the depending plate portion 202 of the slide bar. The rocker arm 206 has a laterally extending portion 212 engageable with the upper end of a plunger 213 which is guided for vertical reciprocation in the carriage 176 and extends through a large opening in the frame plate and has a cam roller 214 at its lower end riding on a cam 215.

The cams 215 of the several tape feeding and severing units 175 are fixed to an auxiliary cam shaft 216 which is supported in bearing brackets 217 (Fig. 3) secured to the underside of the carriage 176 for horizontal, oblique, reciprocable movement therewith. The cam shaft 216 is connected through a universal and telescoping connection 218 to a shaft 219 which is supported in bearing blocks 220 on the frame plate 55 and is connected through a sprocket and chain drive 221 to the main cam shaft 53 for rotation therewith. Thus, the tape feed cams 215 in cooperation with the spring pressed plungers 211 serve to advance the tape feed bars 182, the tape gripping jaws 193, 196 and the tapes 42 gripped between the jaws, to position the ends of the tapes in overlapping relation to the five tangs 26 aligned therewith as shown in Fig. 3 and in dotted lines in Figs. 4 and 5.

The tape 42 of each tape feeding and severing unit 175 is supported and guided in a shallow groove 222 in the upper face of a stationary cutting jaw 223 (Figs. 4 and 10) on the forward portion of the frame plate 186 and the tape passes under a clamp 224 and a movable cutting jaw 225. The jaws 223 and 225 cooperate to sever the tape 42 after it has been welded to the tang 26 and the lower end of the movable cutting jaw 225 is relatively narrow to engage the tape 42 (Fig. 24) and sever it adjacent the tang 26 when the contacts are being welded to the underside of the strip 27. The clamp 224 and the cutting jaw 225 are supported in abutting relation to each other for vertical movement in a guideway formed by the frame plate 186, the cover plate 189, and a member 226 secured to the frame plate (Figs. 2 and 4). The movable cutting jaw 225 is connected at its upper end to one end of a link 227, the upper end of which is pivotally connected to one end of a lever 228 for actuating the movable jaw. The clamp 224 at its upper end has a pin 229 projecting laterally therefrom which is engageable with the upper surface of the lever 228 and is moved thereby in an upward direction, and a leaf spring 230 secured at one end to the lever 228 is engageable with the upper end of the clamp to move it downwardly to yieldably clamp the tape 42 against the surface 223 of the lower cutting jaw 224 in response to rocking movement of the lever 228 in a clockwise direction as viewed in Fig. 19. The cutting edge of the movable cutting jaw 225 is normally positioned above the bottom face of the clamp 224 so that the lever 228 may be moved to a first position to actuate the clamp and cause it to clamp the tape against longitudinal movement and so that the lever may be moved farther to a second position to cause the movable cutting jaw 225 to shear the tape 42.

The lever 228 is mounted intermediate its end for oscillatable movement on a pin 231 which is supported at its ends in the frame plate 186 and the cover plate 189, and the lever is stressed by a spring 232 for movement, tending to raise the clamp 224 and the cutter 225. The other end of the lever 228 engages the upper end of a rod 233 which is guided in a vertical slot 234 in the frame plate 186, and the lower end of the rod rests on a lever 235 (Figs. 2, 3, and 5). The lever 235 is in the form of a wide bar or plate engageable with each of the five rods 233 and having an enlarged hub portion secured to a shaft 237 which is supported in bearing brackets 238 secured to the underside of the carriage 176. A cam lever 239 fixed to the shaft 237 has a cam roller 240 engageable with a cam 241 on the auxiliary cam shaft 216 for effecting the actuation of the clamp 224 and the movable cutting jaw 225 in timed relation to the actuation of the other components of the apparatus.

After the tapes 42 have been fed into overlapping relation to the tangs 26 and the ends of the tapes have been welded thereto, the carriage 176 is advanced from its normal retracted position shown in Fig. 1 to a forward position to move the cutting jaws 223 and 225 into the position shown in Fig. 10 with the lower jaws 223 adjacent the tangs 26 and adjacent the welded end portion of the tapes 42. A block 249 (Fig. 1) is fixed to the underside of the carriage and has a slot therein for receiving a roller 250 mounted on one end of an actuating arm 251, which, at its other end, is mounted for horizontal oscillatable movement about a pin 252 secured to the underside of the frame plate 55. At an intermediate point 253 the arm 251 is pivotally connected to a link 254 which is pivotally connected to one end of a slide 255 mounted for reciprocable movement in a guide 256 which is secured to the underside of the frame plate 55. At its other end the slide 255 has a cam roller 257 which rides in a groove in a cam 258 fixed to the main cam shaft 53, whereby in response to rotation of the cam 258 the carriage 176 is caused to move to and from its normally retracted position and its advanced position in predetermined timed relation to the movement of the other components of the apparatus as indicated on the timing chart (Fig. 24).

Means are provided for actuating the tape gripping jaw 193 in each of the tape feeding units 175 to release its gripping engagement with the tape 42 during movement of the carriage 176 to its forward position so that the tapes will not be advanced with the carriage and damaged thereby. This means includes a horizontally disposed rod 260 slidably supported in a bore 261 in the slide bar 182 (Figs. 5-9) with its forward end in engagement with the depending arm 199 of the gripping jaw 193 and with its other end engageable with the forward end of a pusher bar 263. The pusher bar is mounted behind the tape feed bar 182 and below the guide rail 179 for sliding movement in the rear portion of the slot 185 in the frame plate 186 and has a cylindrical extension in the form of a headed screw 265. This screw projects through an aperture in a member 266 which extends across the end of the guideway 185 and is supported on the frame plate 186 and the cover plate 189 (Fig. 7), and a spring 267 interposed between the member 266 and the head of the screw 265 urges the pusher bar 263 to the right as viewed in Figs. 5 and 6 to its retracted position (Fig. 5). With the pusher bar in its retracted position the tape gripping jaw 193 is free to turn on the pin 194 and is held by the spring 197 in its closed position in gripping engagement with the tape 42.

A triangular-shaped lever 269 which is disposed in a recess 270 in the pusher bar 263 and a recess 271 in the frame plate 186, is pivotally connected at 272 to the bar 263 and is pivotally mounted on a fixed pin 274 which is supported in the frame plate 186 and the cover plate 189. A laterally disposed portion 275 of the lever 269 rests on the upper end of a slide 276 which is mounted for vertical movement in the vertical recess 271 in the frame plate and has a reduced depending portion in the form of a bar 277 supported on an arm 278 of a composite lever 279 (Figs 3 and 5). The arms 278 of the lever 279 are disposed obliquely and fit between the rods 233. The lever 279 has a pair of hubs 280 which are pivotally supported on the shaft 237 adjacent the ends of the lever 235 and the lever 279 has an arm 282 with a cam roller 283 thereon which engages a cam 284. This cam is fixed to the auxiliary cam shaft 216 and serves to reciprocate the pusher bar 263 and cause the tape gripping jaw 193 to release the tape 42 at predetermined intervals.

Thus, in the operation of the tape feeding and severing mechanism, as the five tape feed bars 182 are moved in a forward direction from their retracted positions, the tape gripping jaws 193 which are yieldably held in gripping engagement with the five tapes 42, advance the tapes into overlapping relation with five tangs 26 on the strip 27, after which the clamps 224 are actuated to clamp the tapes 42 against the surfaces 223 and hold the tapes against movement while the tape feed bars 182 and the tape gripping jaws are returned to their normal retracted positions. After the ends of the tapes have been welded to the tangs 26 and prior to advancing the carriage 176 from its retracted position, the cam 283 serves to actuate the linkages 277, 276, 275, 263, 262 to move the movable tape gripping jaws 193 to open position to release the tapes, after which the carriage 176 is advanced to move the cutting jaws 223 and 225 in positions adjacent the tangs 26 and the welded ends of the contact tape 42 as shown in Fig. 10, after which the cam 241 serves to actuate the clamps 224 to clamp the tapes and then actuate the cutters 226 to sever the tapes adjacent the tangs 26 to form the contacts 25 thereon.

From the above description it will be seen that the strip feed 35 operates to advance the strip 27 intermittently to position successive sets of five tangs 26 in welding position in the holder 39 in alignment with the upper and lower electrodes 40 and 41 and in the path of movement of the tapes 42. With the jaws 193 gripping the tapes 42, the tape feed bars 182 are advanced to feed the tapes into overlapping relation to the tangs 26 and the clamps 225 are actuated to clamp the tapes against longitudinal movement. The electrodes 40 and 41 are moved up into engagement with the tangs 26 of the strip 27 and with the contact tapes 42 and a welding current is passed through the electrodes and the overlapping portions of the strip and the tapes to weld the ends of the tapes to the tangs. The electrodes are then moved away from the welded portions of the strip and tapes and as the electrodes return to their open positions, the tape gripping jaws 193 are actuated to open position by the pusher bar 263 and the rod 260 to release the tapes (Fig. 6) While the tape feeding jaws 193 are held in their open position, the carriage 176 is advanced to move the cutting jaws 223 and 225 into close proximity to the tangs 26 of the strip 27 and the welded ends of the tapes 42 as shown in Fig. 5, after which the lever 230 is operated to actuate the clamps 224 to clamp the tapes and to actuate the movable cutter jaws 225 to sever the contact tapes adjacent the tangs to form the contacts 25. The cutting jaws 225 are then retracted but the clamps 224 still hold the tapes against movement while the carriage 176 is returned to its normal retracted position, after which the clamps 224 are raised to release the tapes. During the return movement of the carriage 176 the pusher bar 263 is retracted to render the jaws 193 operable to engage and grip the tape 42 for the next cycle of operation of the apparatus.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for welding contacts onto a strip, the combination of a frame, a holder on the frame for supporting a strip, a carriage mounted on the frame for movement toward and away from the holder, tape feeding means mounted on said carriage for movement therewith and for reciprocable movement thereon and having an element stressed in one direction for gripping said tape for feeding movement therewith, means on the carriage for actuating said tape feeding means to advance the tape into overlapping relation with the strip in said holder, means for welding said tape to said strip, cutting means on said carriage, means for actuating said carriage toward said holder to position the tape cutting means in close proximity to the strip, means for actuating the element on said tape feeding means to release the tape during the movement of the carriage toward said holder, and means on the carriage for actuating the cutting means to sever the tape adjacent said strip to form a contact thereon.

2. In an apparatus for welding contacts on a strip, the combination of a frame, a holder on the frame for supporting a strip, a carriage mounted on the frame for movement toward and away from the holder, a tape feeding member mounted on said carriage for movement therewith and for reciprocable movement thereon and having a guideway for supporting a tape of contact material for movement therewith and for movement relative thereto, said tape feeding member having a gripping jaw mounted thereon for movement therewith and for movement thereon to a closed position for gripping the tape against the member for feeding movement therewith in one direction and to an open position for releasing the tape, resilient means for moving said gripping jaw to closed position, means on the carriage for actuating said tape feeding member to advance the tape into overlapping relation with the strip in said holder, means for welding said tape to said strip, tape cutting means on said carriage, means for actuating said carriage to move the tape cutting means toward said holder into close proximity to the strip, means for actuating said gripping jaw to open position to release the tape during the movement of said carriage toward said holder, and means for actuating the cutting means to sever the tape adjacent said strip to form a contact thereon.

3. In an apparatus for welding contacts onto a strip, the combination of a frame, a holder on the frame for supporting a strip, a carriage mounted on the frame for movement toward and away from the holder, a tape feeding member mounted on said carriage for movement therewith and for reciprocable movement thereon toward and away from the holder and having a guideway for supporting a tape of contact material for movement therewith and for movement relative thereto, a gripping element pivotally mounted on said member for movement therewith, resilient means stressing said gripping element to a closed position for gripping the tape against the member for feeding movement therewith in one direction, means for moving the tape feeding member from a normal retracted position on said carriage to an advanced position to feed the tape toward the holder into overlapping relation with the strip and for returning the tape feeding member to said retracted position, means for welding the tape to said strip, means on said carriage for holding said tape against longitudinal movement while the tape feeding member is returning to its retracted position, tape cutting means mounted on said carriage for movement therewith, means for actuating said carriage toward said holder to position the tape cutting means in close proximity to the strip, means for actuating said gripping element to an open position to release the tape during the movement of said carriage toward said holder, and means for actuating said cutting means to sever the tape adjacent said strip to form a contact thereon.

4. In an apparatus for welding contacts onto a strip, the combination of a frame, a holder on the frame for supporting a strip on which contacts are to be welded, a carriage mounted on the frame for movement toward and away from the holder, a tape feeding member mounted on said carriage for movement therewith and for reciprocable movement thereon toward and away from the holder and having a guideway for supporting a tape of contact material for movement therewith and for movement relative thereto, a gripping element pivotally mounted on said member for movement therewith, resilient means stressing said gripping element to a closed position for gripping the tape against the member for movement therewith in one direction, means on said carriage for moving the tape feeding member from a normal retracted position to an advanced position to feed the tape into overlapping relation with the strip and for returning the tape feeding member to said retracted position, means for welding together the overlapping portions of the strip and the tape, said carriage having a clamping surface for supporting said tape, a clamping member mounted on said carriage for pressing the tape against said clamping surface, a pair of cooperable tape cutting jaws mounted on said carriage for movement therewith and for movement of one jaw relative to the other, means for actuating said carriage toward said holder to position the cutting jaws in close proximity to the strip, means for actuating the gripping elements to open position to release the tape during the movement of said carriage toward said holder, means for actuating the clamping member to hold the tape while the tape feeding member is returned to its retracted position, and means for actuating said movable cutting jaw to sever the tape adjacent the strip to form a contact thereon.

5. In an apparatus for welding contacts onto a strip, the combination of a frame, a holder on the frame for supporting a strip onto which a tape of contact material is to be fed, a carriage mounted on the frame for movement toward and away from the holder, a tape feeding member mounted on said carriage for reciprocable movement thereon toward and away from the holder for supporting a tape of contact material for movement therewith and relative thereto, a gripping element pivotally mounted on said member for movement therewith, resilient means stressing said gripping element to a closed position for gripping the tape against the member for movement therewith toward the holder and the strip, means on said carriage for moving the tape feeding member from a normal retracted position to an advanced position to feed the tape into overlapping relation with the strip in said holder and for returning the tape feeding member to said retracted position, means for welding said tape to said strip, said carriage having a clamping surface for supporting said tape, a clamping member mounted on said carriage for pressing the tape against said clamping surface, a pair of cooperable tape cutting jaws mounted on said carriage for movement therewith and for movement of one jaw relative to the other, means for actuating said carriage toward said holder to position the cutting jaws in close proximity to the strip, means for actuating the gripping element to release the tape during the movement of said carriage toward said holder, an actuating lever pivotally mounted on said carriage and operatively connected to the movable cutting jaw, resilient means for yieldably connecting the clamping member to said lever for actuation thereby in advance of said movable cutting jaw, means on said carriage for actuating said lever from a normal inoperative position to a first position to effect the actuation of the clamping member to hold the tape against said clamping surface while the tape feeding member is returned to its retracted position and for actuating said lever to a second position to effect the actuation of said movable cutting jaw to sever the tape.

6. In an apparatus for welding contacts onto a tape, the combination of a frame, a holder on the frame for supporting a strip on which contacts are to be welded, a reciprocable carriage mounted on the frame for movement from a normal retracted position toward the holder, a tape feeding member mounted on said carriage for movement therewith and for reciprocable movement thereon toward and away from the holder and having a guideway for supporting a tape of contact material for movement therewith and for movement relative thereto, a gripping element pivotally mounted on said member for movement therewith, resilient means stressing said gripping element to a closed position for gripping the tape against the member for movement therewith in one direction, means on said carriage for moving the tape feeding member from a normal retracted position to an advanced position to feed the tape into overlapping relation with the strip and for returning the tape feeding member to said retracted position, means for welding together the overlapping portions of the tape and strip, said carriage having a clamping surface for supporting said tape, a clamping member mounted on said carriage for pressing the tape against said clamping surface, a pair of cooperable tape cutting jaws mounted on said carriage for movement therewith and for movement of one jaw relative to the other, means for actuating said carriage toward said holder to position the cutting jaws in close proximity to the strip, means for actuating the gripping elements to open position to release the tape during the movement of said carriage toward said holder, an actuating lever pivotally mounted on said carriage and operatively connected to the movable cutting jaw, resilient means for yieldably connecting the clamping members to said lever for actuation thereby in advance of said movable cutting jaw, means on said carriage for actuating said lever from a normal inoperative position to a first position to effect the actuation of the clamping member to press the tape against the clamping surface while the tape feed member is returned to its retracted position and while the carriage is being returned to its retracted position and for actuating said lever to a second position to effect the actuation of said movable cutting jaw to sever the tape.

7. In an apparatus for welding contacts onto a part, the combination of a frame, a holder on the frame for supporting the part, a carriage mounted on the frame for movement toward and away from the holder, a tape feeding member mounted on the carriage for movement therewith and for reciprocable movement relative thereto, means on said tape feeding member for normally gripping said tape for feeding movement with said member, means on the carriage for actuating said tape feeding member to advance the tape into overlapping relation with the part in said holder, means for welding the tape to the part, cutting means on the carriage, means for moving the carriage toward the holder to position the tape cutting means in close proximity to the part, means for actuating said tape gripping means to release the tape during the movement of the carriage toward said holder, and means on the carriage for actuating the cutting means to sever the tape adjacent the part.

References Cited in the file of this patent

UNITED STATES PATENTS

| | | |
|---|---|---|
| 2,339,884 | Schlumpf | Jan. 23, 1944 |
| 2,351,722 | Swenson | June 20, 1944 |